United States Patent
Bonzini et al.

(10) Patent No.: US 10,630,484 B2
(45) Date of Patent: *Apr. 21, 2020

(54) SECURING CODE LOADING BY A GUEST IN A VIRTUAL ENVIRONMENT

(71) Applicant: RED HAT ISRAEL, LTD, Ra'anana (IL)

(72) Inventors: Paolo Bonzini, Milan (IT); Michael Tsirkin, Westford, MA (US)

(73) Assignee: Red Hat Israel, Ltd., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/999,413

(22) Filed: Aug. 20, 2018

(65) Prior Publication Data

US 2019/0044733 A1 Feb. 7, 2019

Related U.S. Application Data

(63) Continuation of application No. 15/056,558, filed on Feb. 29, 2016, now Pat. No. 10,057,069.

(51) Int. Cl.
*G06F 21/00* (2013.01)
*H04L 9/32* (2006.01)
*G06F 9/455* (2018.01)

(52) U.S. Cl.
CPC ........ *H04L 9/3247* (2013.01); *G06F 9/45558* (2013.01); *G06F 2009/45583* (2013.01); *G06F 2009/45587* (2013.01)

(58) Field of Classification Search
CPC ............... H04L 9/3247; G06F 9/45558; G06F 9/44521; G06F 2009/454583; G06F 2009/45587

See application file for complete search history.

(56) References Cited

U.S. PATENT DOCUMENTS

| | | | | |
|---|---|---|---|---|
| 5,421,006 A | * | 5/1995 | Jablon | G06F 21/565 713/187 |
| 8,341,627 B2 | * | 12/2012 | Mohinder | G06F 12/145 718/1 |

(Continued)

OTHER PUBLICATIONS

Sarah J. Andrabi, *Verification of XMHF HPT Protection Setup*, University of North Carolina Chapel Hill, http://cs.unc.edu/~sandrabi/Project_work/VerificationofXMHFHPTProtectionSetup.pdf.

(Continued)

*Primary Examiner* — Yogesh Paliwal
(74) *Attorney, Agent, or Firm* — Haynes and Boone, LLP

(57) ABSTRACT

Methods, systems, and computer program products are included for loading a code module. A method includes verifying, by a guest, a digital signature of a code module stored in an initial guest memory buffer. The guest copies the verified code module stored at the initial guest memory buffer into a target guest memory buffer and applies, using one or more symbol entries, one or more relocations to the verified code module stored at the target guest memory buffer. The guest sends a request to a hypervisor to set the target guest memory buffer to a write-protect mode. In response to a determination that first content stored in the initial guest memory buffer corresponds to second content stored in the target guest memory buffer, the guest sends a request to the hypervisor to set the target guest memory buffer to an executable mode.

20 Claims, 4 Drawing Sheets

(56) References Cited

U.S. PATENT DOCUMENTS

| | | |
|---|---|---|
| 8,838,935 B2 | 9/2014 | Hinton et al. |
| 8,909,898 B2 | 12/2014 | Durham et al. |
| 8,966,629 B2 | 2/2015 | Sallam |
| 9,063,899 B2 | 6/2015 | Epstein |
| 2004/0123290 A1* | 6/2004 | Overton .............. G06F 9/45504 718/1 |
| 2013/0132690 A1 | 5/2013 | Epstein |
| 2014/0115652 A1 | 4/2014 | Kapoor et al. |
| 2014/0380009 A1 | 12/2014 | Lemay et al. |
| 2015/0163248 A1 | 6/2015 | Epstein |
| 2016/0299851 A1* | 10/2016 | Mattson, Jr. ........ G06F 9/45558 |

OTHER PUBLICATIONS

Mikhail Gorobets et al., *Attacking Hypervisors via Firmware and Hardware*, 2015, http://www.intelsecurity.com/advanced-threat-research/content/AttackingHypervisorsViaFirmware_bhusa15_dc23.pdf.

* cited by examiner

SECURING CODE LOADING BY A GUEST IN A VIRTUAL ENVIRONMENT

CROSS REFERENCE TO RELATED APPLICATION

The present application is a continuation of U.S. patent application Ser. No. 15/056,558, filed on Feb. 29, 2016, which is hereby incorporated by reference in its entirety.

FIELD OF DISCLOSURE

The present disclosure generally relates to virtualization, and more particularly to code loading in a virtual environment.

BACKGROUND

A host machine (e.g., computer or server) is typically enabled to simultaneously run one or more virtual machines using a software application known as a hypervisor. The hypervisor allocates portions of the host machine's resources to each of the virtual machines. The hypervisor virtualizes the underlying hardware of the host machine or emulates hardware devices, making the use of the virtual machine transparent to a local or remote client. Typically, a hypervisor manages allocation and virtualization of computer resources and performs context switching, as may be necessary, to cycle between various virtual machines, such that many virtual machines may be run simultaneously.

Each virtual machine may function as a self-contained platform, running applications and its own operating system that is referred to as a guest or guest operating system. Guests may be accessed by clients to perform computing tasks. Conventionally, each guest operating system includes a kernel that performs important tasks such as executing processes and handling interrupts.

BRIEF SUMMARY

This disclosure relates to code loading by a guest in a virtual environment. Methods, systems, and techniques for code loading are provided.

According to an example, a method of code loading includes verifying, by guest, a digital signature of a code module stored in an initial guest memory buffer. The method also includes copying, by the guest, the verified code module stored at the initial guest memory buffer into a target guest memory buffer. The method further includes applying, using one or more symbol entries, one or more relocations to the verified code module stored at the target guest memory buffer. The method also includes sending, by the guest, a request to a hypervisor to set the target guest memory buffer to a write-protect mode. The method further includes in response to a determination that first content stored in the initial guest memory buffer corresponds to second content stored in the target guest memory buffer, sending a request to the hypervisor to set the target guest memory buffer to an executable mode.

According to an example, a system for code loading includes a guest kernel that stores a set of symbol entries. The system also includes a guest loader that loads a code module into an initial guest memory buffer, verifies a digital signature of the code module stored in the initial guest memory buffer, copies the verified code module stored at the initial guest memory buffer into a target guest memory buffer, and applies, using one or more symbol entries, one or more relocations from one or more relocation entries to the verified code module stored at the target guest memory buffer. In response to a determination that first content stored in the initial guest memory buffer corresponds to second content stored in the target guest memory buffer, the guest loader sends a request to a hypervisor to set the target guest memory buffer to an executable mode.

According to an example, a non-transitory machine-readable medium includes machine-readable instructions executable to cause a machine to perform operations comprising: verifying, by guest, a digital signature of a code module stored in an initial guest memory buffer; copying, by the guest, the verified code module stored at the initial guest memory buffer into a target guest memory buffer; applying, using one or more symbol entries, one or more relocations to the verified code module stored at the target guest memory buffer; sending, by the guest, a request to a hypervisor to set the target guest memory buffer to a write-protect mode; and in response to a determination that first content stored in the initial guest memory buffer corresponds to second content stored in the target guest memory buffer, sending a request to the hypervisor to set the target guest memory buffer to an executable mode.

Embodiments of the present disclosure and their advantages are best understood by referring to the detailed description that follows.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
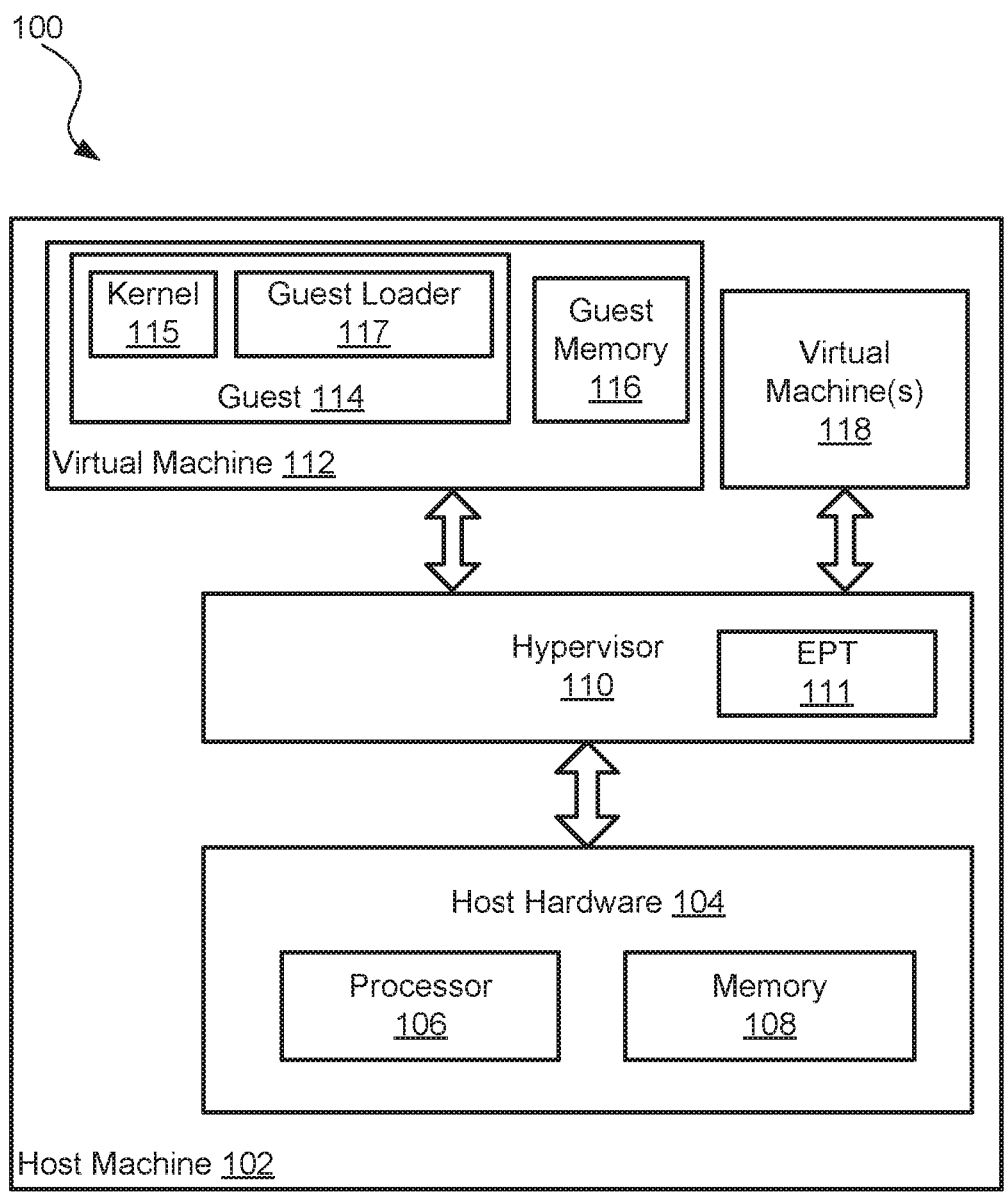
FIG. 1 is a block diagram illustrating a system for securing code loading by a guest in a virtual environment in accordance with one or more embodiments.

FIG. 1 is a block diagram illustrating a system 100 for securing code loading by a guest in a virtual environment in accordance with one or more embodiments. The system 100 includes a host machine 102. The host machine 102 includes host hardware 104. Host hardware 104 includes physical elements such as a processor 106, memory 108, and may also include other input/output (I/O) devices, such as those illustrated in FIG. 4. The host machine 102 includes a hypervisor 110, which also may be referred to as a virtual machine monitor. The hypervisor 110 may include executable instructions that are stored in the memory 108 and executed by the processor 106. In some examples, the hypervisor 110 is run on top of a host operating system. In other examples, the hypervisor 110 is run directly on host hardware 104 without the use of a host operating system.

The processor 106 may represent one or more processors acting in concert. A "processor" may also be referred to as a "CPU" or "physical processor" herein. A processor shall refer to a device capable of executing instructions encoding arithmetic, logical, or I/O operations. In one illustrative example, a processor may follow the Von Neumann architectural model and may include an arithmetic logic unit (ALU), a control unit, and a plurality of registers. In a further aspect, a processor may be a single-core processor that is typically capable of executing one instruction at a time (or process a single pipeline of instructions), or a multi-core processor that may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket).

The memory 108 may be one or more of many different types of memory. "Memory" herein shall refer to volatile or non-volatile memory, such as random access memory (RAM), read-only memory (ROM), electrically erasable ROM (EEPROM), or any other memory capable of storing data. Some types of memory, such as solid state drives typically have relatively larger storage volume but relatively slower performance. Other types of memory, such as those used for RAM, are optimized for speed and are often referred to as "working memory." The various types of memory may store information in the form of software and data. The software may include an operating system, hypervisor 110, and various other software applications.

In the present example, hypervisor 110 provides one or more virtual machines, such as the virtual machine 112 and virtual machine(s) 118. In other examples, there may be any number of virtual machines. Each virtual machine is an underlying virtualization of host machine 102. Each virtual machine may be, for example, a hardware emulation, full virtualization, para-virtualization, and operating system-level virtualization virtual machine.

The hypervisor 110 manages system resources, including access of virtual machines (e.g., virtual machine 112 and virtual machine(s) 118) to the host hardware 104, such as processor 106, memory 108, and other hardware devices. In some examples, the system resources that may be provided to each virtual machine include a virtual CPU, guest memory, one or more virtual devices, such as a network device, an emulated NIC or disk, virtual firmware such as a Basic Input/Output System (BIOS) and/or an Extensible Firmware Interface (EFI), and so forth.

In the present example, the hypervisor 110 provides a guest 114, also called a guest operating system, which runs on the virtual machine 112. The hypervisor 110 may create virtual machine 112 and boot the guest 114 that runs on the virtual machine 112. In some examples, the boot process includes execution of virtual firmware, such as a virtual BIOS or UEFI, to load the devices, such that the devices may be accessed by the guest 114. The guest 114 running on a virtual machine 112 may include a same or a different operating system as a host operating system running on the host machine 102. Moreover, each of the virtual machine(s) 118 may also include a guest that provides a same operating system or a different operating system as the host operating system and/or the guest 114. Accordingly, the host machine 102 may run multiple operating systems concurrently and in isolation from other operating systems.

The guest 114 is structured to include a kernel 115, which may also be referred to as a guest kernel. The kernel 115 is the core of the guest 114 and is structured to manage important tasks of the virtual machine 112. For example, the kernel 115 may be used for allocating guest memory 116, sending and receiving I/O, managing a file system of the guest 114, handling interrupts, providing access to one or more processors to execute application instructions, and so forth. In the present example, the kernel 115 communicates with the processor 106 (or a virtual processor allocated to the virtual machine 112) and other virtual machine 112 devices to process I/O requests corresponding to the virtual machine 112.

In some examples, the guest 114 is structured as a stand-alone kernel, while in other examples the guest 114 is structured with a kernel as well as one or more additional applications that are built on top of the kernel. Examples of guests include, for example, LINUX, UNIX, DOS, OS/2, IOS, ANDROID, WINDOWS, and so forth. Accordingly, the guest 114 may include features such as a graphical user interface, file system, and various user applications. Each virtual machine 118 may be structured with a guest operating system that includes a kernel.

In an example, the kernel 115 is structured to include device drivers. For example, device drivers corresponding to devices of the virtual machine 112 may be loaded into the kernel 115. In another example, the kernel 115 is structured to include a portion of a firewall that is designed to block unauthorized access to a computer system or network. These drivers and portions of firewalls are examples of code modules that may be loaded into the kernel 115. Other examples of code modules that may be loaded into the kernel 115 also include other types of code modules. For example, a code module may be a library or even an entire kernel. Accordingly, the kernel 115 that is included in the guest 114 is structured to expand to encompass additional code modules. Code modules may include any data and/or executable instructions. Examples of techniques for loading code modules into the kernel 115 are provided in greater detail with respect to FIGS. 2 and 3.

The hypervisor 110 provides a guest memory 116 that is allocated to the guest 114. In the present example, the guest memory 116 is a virtualized portion of the memory 108. The guest memory 116 may include one or more guest memory pages that are mapped to memory pages of the memory 108 via one or more mappings, such as page tables. The mapping may be provided by the hypervisor 110. As an example, page tables may include Extended Page Tables (EPT) 111.

In the present example, the hypervisor 110 is structured to have access to read, write, and/or execute instructions on the guest memory 116. For example, the hypervisor 110 may access areas of the guest memory 116 that are allocated to the kernel of the guest 114, but that are restricted from other portions of the guest 114. Further, the hypervisor 110 may also be allocated other areas of memory 108 that are not mapped to the guest memory 116. These other areas of memory may be inaccessible to the guest 114 (both the kernel as well as non-kernel portions of the guest 114). Accordingly, the hypervisor 110 is structured with access to memory for performing read, write, and/or execute operations.

The guest memory pages may be fully or partially controlled by the guest 114. For example, the kernel 115 may allocate memory pages from the guest memory 116 to run processes and execute applications on the virtual machine 112. Each virtual machine 118 may include a same or different guest memory that is mapped to a portion of the memory 108. In the present example, the guest memory 116 includes guest memory pages that are allocated to the kernel 115. These memory pages that are allocated to the kernel 115 may be protected from access by other applications running on the virtual machine 112. In some examples, the memory pages allocated to the kernel 115 may be structured on the virtual machine 112 as pages that are protected from access (e.g., read, write, and/or execute access) by non-kernel applications. For example, the memory pages of the guest memory 116 may include permissions that may be modified by the kernel 115, such that read, write, and/or execute access to the memory pages may be restricted. In some examples, the memory pages are structured to include one or more flags or other permissions structures that are be modified to restrict access to the memory pages. For example, the permissions may be structured as one or more flags that may be set to on or off values by the kernel to modify the permissions.

The kernel 115 may also distinguish between the kernel and non-kernel portions of the guest 114. For example, the guest 114 may include a graphical user interface and other applications that run on top of the kernel. The kernel may modify permissions of an area of memory that includes one or more memory pages in the guest memory 116. The permissions may be modified such that the area of guest memory 116 may be writable and executable by the kernel 115, but not writable or executable by non-kernel portions of the guest 114. Similarly, the kernel 115 may modify permissions of the one or more memory pages in the area of guest memory 116 to allow the non-kernel portions of the guest 114 to write to the one or more memory pages and/or execute instructions stored on the one or more memory pages.

The guest 114 is structured to include one or more code modules that may be loaded into the kernel 115 of the guest 114, one or more encryption keys that are used to generate digital signatures corresponding to the code modules, and one or more decryption keys that may be distributed to other applications for verifying the code modules. The keys may be used to verify the digital signature of a code module. The code module and its corresponding digital signature may together be referred to as a signed code module. In some examples, the one or more encryption keys that may be used to generate signatures may be referred to as private keys. The one or more decryption keys that may be used to verify the code modules may be referred to as public keys. Each private key that is used to sign a code module may be structured as a member of a key pair with a public key that is used to verify the code module. The digital signature may be generated based on an input of the code module and an encryption key into a signature generation module. The encryption key may be a member of a key pair with a decryption key. The guest 114 may validate code modules to ensure that they have not been tampered with before executing them. In some examples, code modules, keys, and signatures may be stored in the guest memory 116 and/or other portions of the memory 108 accessed by the guest 114.

The guest memory pages in the guest memory 116 may be allocated for storing data and/or code of files, such as data files and binary files. Binary files may be formatted in the Executable and Linkable Format (ELF) (formerly called the Extensible Linking Format), such that they may be executed by the guest 114. Binary files may also be referred to as executable files, object files, programs, and/or applications. The binary files may include sections that are allocated to one or more memory pages of the guest memory 116. In the present example, code modules are structured as one or more binary files and/or one or more data files.

The guest 114 is structured to include a guest loader 117. During runtime of the guest 114, the guest loader 117 is structured to dynamically allocate guest memory 116 and load code and/or data corresponding to the binary files into the allocated memory to prepare the binary files for execution. The binary files may be loaded to different memory addresses each time they are executed, rather than having fixed memory addresses in the guest memory 116. In some examples, the code corresponds to executable instructions of code modules (e.g., one or more kernel modules, device drivers, kernels, and so forth). In some examples, the binary files are structured to include at least two parts: a first part that includes code and/or data of the binary, and a second part that includes relocation entries. The second part that includes relocation entries may be referred to as a relocation section. The relocation section of the binary file may store one or more relocation entries.

Relocation entries reference relative locations of code and/or data of the binary, such that during runtime the code and/or data referenced by the relocation entries may be updated. In some examples, each relocation entry is structured to reference a location of code and/or data in symbolic form. For example, a relocation entry may include a symbol string, a reference/mapping to a place in the code and/or data of the binary, and a relative address. A symbol string may be, for example, an alphanumeric string corresponding to a function name or module name. The relative address may be, for example, an offset from the base address of the function or module corresponding to the symbol string. In some examples, the offset is stored at the referenced place in the code and/or data of the binary, rather than in the relocation entry itself.

In the present example, the guest 114 is structured with a symbol table that includes one or more symbol table entries. Each symbol table entry may be structured to reference a location of code and/or data in symbolic form. For example, a symbol table entry may include a symbol string and a corresponding memory address. The address in the symbol table entry may be referred to as a base address and/or a virtual address. While the "symbol table entries" phrase includes the term "table," it is not necessary that the entries be structured in a table form. Accordingly, the symbol table entries may also be referred to as "symbol entries."

The guest loader 117 is structured to update the relative addresses specified in the code and/or data of the binary files to fixed/absolute addresses when the binary files are loaded for execution. The relative addresses in the code and/or data of the binary files may be updated by computing a fixed/absolute address from the base addresses provided by the symbol table entries and the offsets provided by the relocation entries.

Each relocation entry may be structured to include a relative address that is an offset from a base address. Each symbol table entry may be structured to provide a particular virtual address to use as the base address. The guest loader 117 is structured to match symbol strings from the relocation section of the binary file with symbol strings of the symbol table entries to identify which base address corresponds to each offset. Accordingly, upon determining a match between a symbol string of a relocation entry and a symbol string of a symbol table entry, the code and/or data location referenced in the relocation entry is updated to store the address that results from adding the base address provided by the symbol table entry to the corresponding offset provided by the relocation entry. Accordingly, the code and/or data of the binary file are updated, by the guest loader 117, to reference fixed/absolute addresses in memory.

The modifying of code and/or data of the binary file based on the symbol table entries and the relocation entries may be referred to as applying relocations. In other examples, relocations may be applied to the code and/or data of the binary file in other ways. For example, applying relocations may refer to any changing of the addresses included in the code and/or data of the binary file that is based on processing relocation entries corresponding to the binary file. In some examples, applying relocations refers to applying changes requested by one or more relocation entries included in the binary file.

Figure 2:
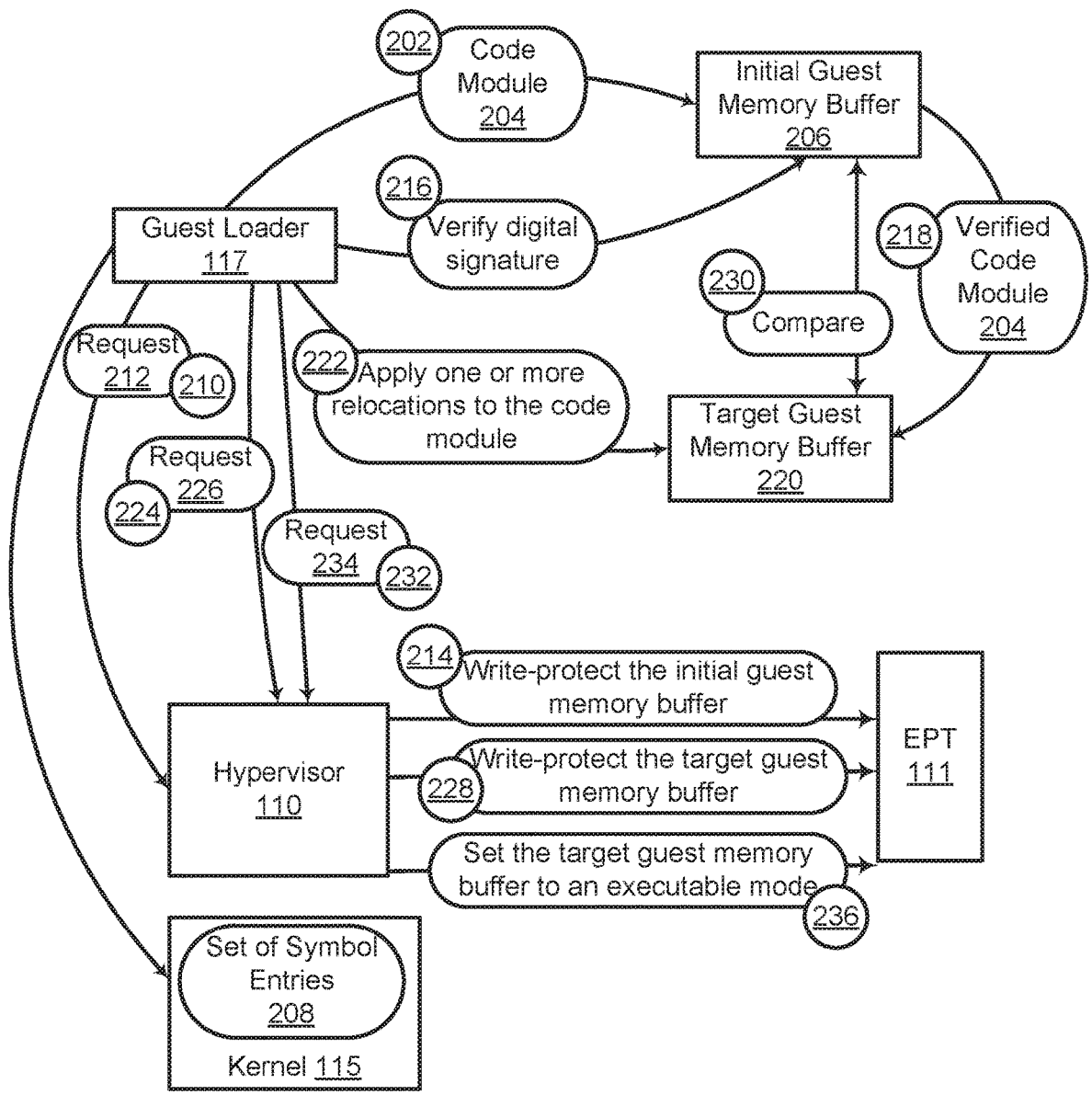
FIG. 2 is a process flow diagram for loading and verifying a code module by a guest in accordance with one or more embodiments.
Figure 3:
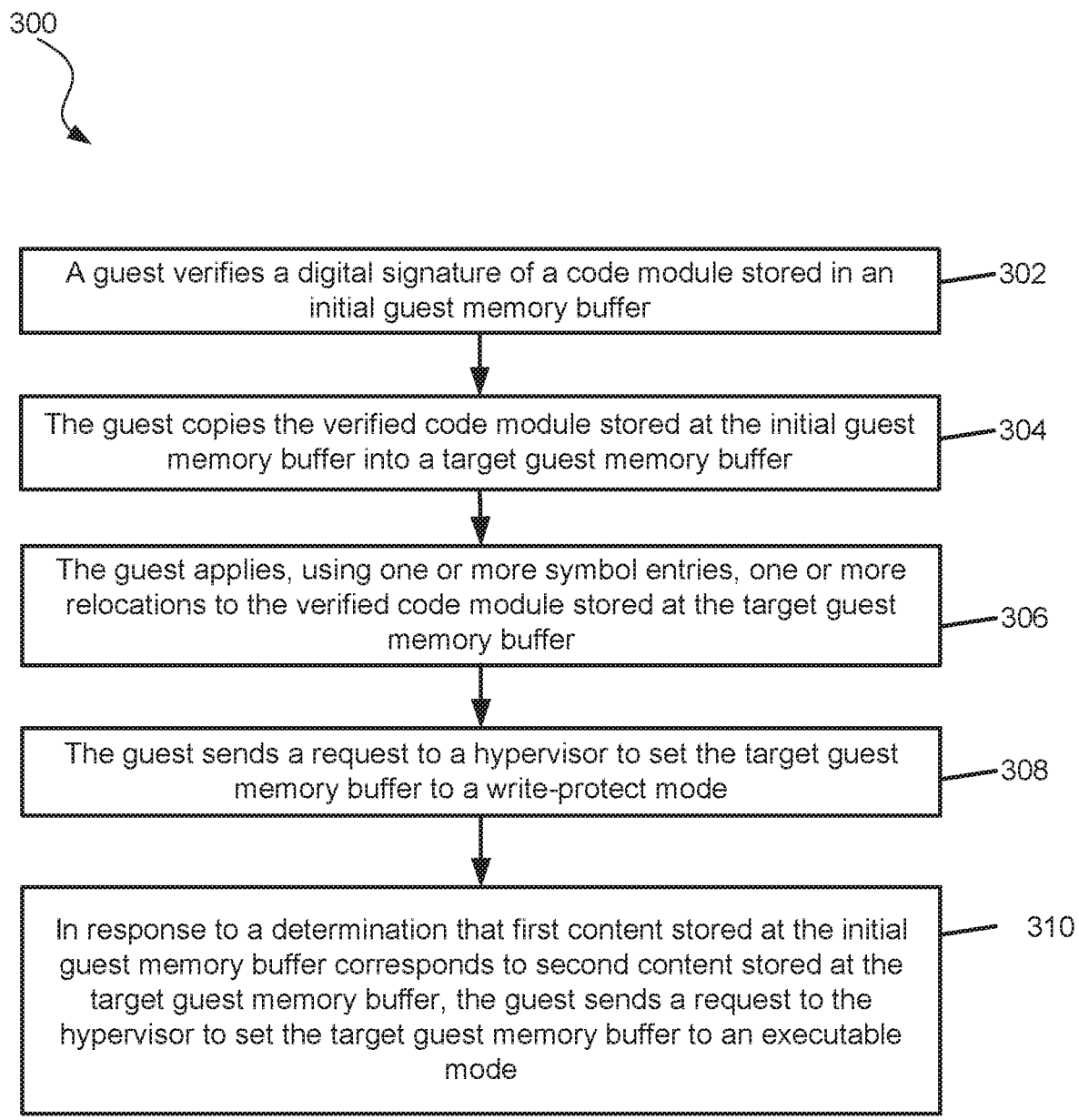
FIG. 3 is a flow diagram illustrating a method for verifying a code module by a guest in accordance with one or more embodiments.

FIGS. 2 and 3 provide techniques for loading and/or verifying one or more code modules by the guest. FIG. 2 is a process flow diagram 200 for loading and verifying a code module by a guest in accordance with one or more embodiments. The process flow diagram 200 may be performed by processing logic that includes hardware (e.g., circuitry, dedicated logic, programmable logic and microcode), software (such as instructions run on a computer system, specialized hardware, dedicated machine, or processing device), firmware, or a combination thereof. In some examples, the process flow diagram 200 is performed by the system 100 illustrated in FIG. 1. For example, the process flow diagram 200 may be performed on the host machine 102. In some examples, the order of the actions described below may also be performed according to alternative orderings. In yet other examples, additional actions may be added and actions that are described may be removed.

At action 202, guest loader 117 loads a code module 204 into an initial guest memory buffer 206. The code module 204 includes code and/or data and corresponds to a digital signature and one or more relocation entries. In some examples, the guest 114 loads the code module 204 into the initial guest memory buffer 206 when an instruction is executed by the kernel 115 to load the code module 204. For example, the kernel 115 may include instructions that are executed to load a driver, dynamic library, or other kernel module. Code module 204 may be loaded from disk, a file system, or a guest user space memory buffer. Accordingly, upon executing the instructions, the guest 114 may load the code module 204 and a digital signature corresponding to the code module 204 into the initial guest memory buffer 206 to verify the code module 204 prior to it being executed by the guest 114.

In the present example, the kernel 115 stores a set of symbol entries 208. The set of symbol entries 208 may be loaded into the kernel 115 before code module 204 is loaded into the initial guest memory buffer 206. Each code module may add more symbol entries to set of symbol entries 208 in the kernel 115 after code module 204 has been loaded into the initial guest memory buffer 206. As further discussed below, relocation entries from the code module 204 may be matched with symbol entries from the kernel 115.

At action 210, guest loader 117 sends a request 212 to the hypervisor 110 to set the initial guest memory buffer 206 to a write-protect mode. At an action 214, the hypervisor 110 receives the request 212 and protects the initial guest memory buffer 206 from modification by the guest 114. In some examples, the guest loader 117 sends the virtual memory address of code module 204, which is stored in the initial guest memory buffer 206, to the hypervisor 110, and the hypervisor 110 sets the permissions of the initial guest memory buffer 206 in EPT 111 to write-protect those pages. The guest 111 may invoke a hypercall that causes hypervisor 110 to modify the permissions in EPT 111 to write protect the initial guest memory buffer 206. The hypervisor 110 may mark one or more memory pages corresponding to the code module 204 as write-protected. In this way, the content stored in the initial guest memory buffer 206 is protected from being modified at the hypervisor level.

In yet other examples, if the request 212 includes a reference to a location of the code module 204 in guest memory, the hypervisor 11 may modify the permissions of the guest 114, such that the guest 114 is prevented from performing write operations at the location. For example, the hypervisor 111 may modify permissions of one or more memory pages in the guest memory 116 that store the code module 204 to remove the guest's write access privileges. In some examples, the hypervisor 111 may further prevent the guest 114 from reading and/or executing the instructions of the code module 204 by modifying the permissions of the one or more memory pages to remove guest 114 read and/or execute access privileges. Accordingly, the code module 204 is protected from being modified by the guest 114.

At action 216, the guest loader 117 verifies the code module 204. In the guest memory 116, the code module 204 may be stored with its corresponding digital signature. The digital signature may be provided by the operating system vendor. In some examples, the digital signature is embedded in the code module 204. In some examples, the digital signature is separate from the code module 204. The verification may be performed by inputting the public key corresponding to the guest 114 and the digital signature corresponding to the code module 204 into a decryption algorithm to decrypt the digital signature.

In some examples, the digital signature for the code module 204 may be a cryptographic string that is produced by inputting the code module 204 and a private key of the guest 114 into a signing algorithm. The private key corresponds to a public key that is a member of a same key pair as the private key. In some examples, a hash or digest corresponding to the code module 204 may be included in the digital signature. The hash or digest may represent a compacted representation of the code module 204, which may enable faster authentication/verification of the code module 204.

The decrypted signature may be compared with the code module 204 to determine a match. In some examples, the decrypted signature is compared via a byte-by-byte matching with the code module 204. In other examples, the decrypted signature includes a hash corresponding to the code module 204. In these examples, the guest loader 117 may calculate a hash corresponding to the code module 204 and compare the hash with the hash obtained from the decrypted signature. Accordingly, the guest loader 117 determines whether the signature matches the code module 204. In the event of a successful match, the guest loader 117 identifies the code module 204 as verified. Otherwise, if the digital signature does not match the code module 204, the guest 111 may reject/abort a load of the code module 204. The guest 111 may log an error corresponding to the verification failure. If the guest loader 117 was able to verify the code module 204, then the code module 204 has not been compromised and the process flow 200 may proceed at action 218.

At action 218, after the guest loader 117 has verified the code module 204, the guest loader 117 copies the code module 204 stored at the initial guest memory buffer 206 into a target guest memory buffer 220. At an action 222, the guest loader 117 applies, using one or more symbol entries of set of symbol entries 208, one or more relocations of the one or more relocation entries to the verified code module 204 stored at the target guest memory buffer 220. The set of symbol entries 208 may be write-protected so that they are not modifiable by the guest 114.

The guest loader 117 may apply the relocations by matching the symbol strings included in the relocation entries of the code module 204 with the symbol strings of the symbol table entries of set of symbol entries 208. For example, a relocation entry may include a symbol string, a relative address that is an offset from a base address, and a pointer to a location in the code/data of the verified code module 204. A symbol table entry may include the same symbol string and a particular virtual address to use as the base address. For each relocation entry that includes a symbol that matches a symbol included in a symbol table entry, the offset provided by the relocation entry is added to the base address provided by the symbol table entry. The address that results from the addition of the base address and the offset is stored at the location referenced by the relocation entry. Accordingly, the code and/or data of the code module 204 is updated to specify a fixed/absolute address.

The guest loader 117 may similarly apply relocations to other portions of the code and/or data based on the matching between the symbol table entries and the relocation entries, the adding of the base addresses and offsets, and the updating of the code and/or data with the results of the addition. In other examples, relocations may be applied to the verified code module 204 in other ways.

In an example, the guest loader 117 matches a symbol string corresponding to the symbol entry with one or more symbol strings of the one or more symbol entries. In this example, based on the matching, the guest loader 117 may reject the symbol entry. A rejected symbol entry is not added to the symbol table, so that it does not override the previously added symbol entry with the same name. In some examples, the guest loader 117 stops loading the kernel mode after rejecting a symbol entry. In another example, the guest loader 117 determines that a symbol string corresponding to the symbol entry does not match any symbol strings of the one or more symbol entries. In this example, based on the determination that the symbol string corresponding to the symbol entry does not match any symbol strings of the one or more symbol entries, the guest loader 117 may accept the symbol entry. An accepted symbol entry is added to the symbol table, so that it can be looked up when loading more modules into the guest.

At action 224, after applying the relocations to the verified code module 204, the guest loader 117 sends a request 226 to the hypervisor 110 to set the target guest memory buffer 220 to a write-protect mode. At an action 228, the hypervisor 110 receives the request 226 and protects the target guest memory buffer 220 from modification by the guest 114. In some examples, the guest loader 117 sends the virtual memory address of the verified code module 204, which is stored in the target guest memory buffer 220, to the hypervisor 110, and the hypervisor 110 sets the permissions of the target guest memory buffer 220 in EPT 111 to write-protect those pages. The guest 111 may invoke a hypercall that causes hypervisor 110 to modify the permissions in EPT 111 to write protect the target guest memory buffer 220. The hypervisor 110 may mark one or more memory pages corresponding to the verified code module 204 as write-protected. In this way, the content stored in the target guest memory buffer 220 is protected from being modified at the hypervisor level.

At action 230, the guest loader 117 compares first content stored in the initial guest memory buffer 206 and second content stored in the target guest memory buffer 220. The guest loader 117 may compare the first content (e.g., the bytes) and the second content (e.g., the bytes) by determining whether the first content is the same as the second content. The guest loader 117 may determine that the first content corresponds to the second content if the first content is the same as the second content.

At an action 232, in response to a determination that the first content corresponds to the second content, the guest loader 117 sends a request 234 to the hypervisor 110 to set the target guest memory buffer 220 to an executable mode. If the first content corresponds to the second content, then the guest 114 may be assured that the code module 204 has not been undesirable modified during the process of applying relocations.

At an action 236, the hypervisor 110 receives the request 234 and sets the target guest memory buffer 220 to an executable mode. In some examples, the guest loader 117 sends the virtual memory address of the verified code module 204, which is stored in the target guest memory buffer 220, to the hypervisor 110, and the hypervisor 110 sets the permissions of the target guest memory buffer 220 in EPT 111 to an executable mode so that the guest 111 can execute those pages. The guest 111 may invoke a hypercall that causes hypervisor 110 to modify the permissions in EPT 111 to set the target guest memory buffer 220 to the executable mode. The hypervisor 110 may mark one or more memory pages corresponding to the verified code module 204 stored in the target guest memory buffer 220 as executable. The hypervisor 110 allows the guest 114 to execute the verified code module 204. In this way, the content stored in the target guest memory buffer 220 is executable by the guest 111. The guest may then execute the code module 204 stored at target guest memory buffer 220.

Additionally, in response to a determination that the first content stored in the initial guest memory buffer 206 corresponds to the second content stored in the target guest memory buffer 220, the guest loader 117 may send a request to the hypervisor 110 to set the initial guest memory buffer 206 to a writable mode. In this way, memory may be freed and reused because the initial guest memory buffer 206 may be used to store other data.

In contrast, if the first content is different from the second content, the guest loader 117 determines a relocation that was applied to the target guest memory buffer 220, at a first memory address where the initial guest memory buffer 206 is different from the target guest memory buffer 220. The guest loader 117 determines a difference between the first memory address of the initial guest memory buffer 206 and the first memory address of the target guest memory buffer 220, and determines an expected difference between the initial guest memory buffer 206 and the target guest memory buffer 220 in accordance with the relocation entry for the relocation that was applied. The guest loader 117 determines that the initial guest memory buffer 206 corresponds to the target guest memory buffer 220 if the difference is equal to the expected difference for the relocation. For example, if the first content stored in the initial guest memory buffer 206 is "0x200" and the second content stored in the target guest memory buffer 220 is "0x500," the guest 114 looks up a relocation corresponding to the mismatching address and determines the expected difference to be "0x300." Because "0x300" is the difference between "0x200" and "0x500", the guest loader 117 determines that the initial guest memory buffer 206 corresponds to the target guest memory buffer 200. In response to a determination that the initial guest memory buffer 206 corresponds to the target guest memory buffer 220, actions 224 and 236 may be performed. Accordingly, the guest 111 may execute the verified code module 204 stored at the target guest memory buffer 220.

FIG. 3 is a flow diagram illustrating a method 300 for verifying a code module by a guest in accordance with one or more embodiments. The method 300 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, the method is performed by the system 100 illustrated in FIG. 1. For example, the method 300 may be performed on the host machine 102. In some examples, the order of the actions described below may also be performed according to alternative orderings. In yet other examples, additional actions may be added and actions that are described may be removed.

At action 302, the guest 114 verifies a digital signature of the code module 204 stored in the initial guest memory buffer 206. The kernel 115 may allocate an area of guest memory (e.g., one or more memory pages of the guest memory 116) for the code module 204 and store the code module 204 in the allocated area of guest memory 116. In an example, the allocated area of guest memory 116 may be the initial guest memory buffer 206. The code module 204 may include a digital signature (e.g., the code module may be a signed code module).

At action 304, the guest 114 copies the verified code module stored at the initial guest memory buffer 206 into the target guest memory buffer 220. At action 306, the guest 114 modifies the code and/or data of the code module stored at the target guest memory buffer by applying, using one or more symbol entries, one or more relocations to the relocation entries to the verified code module stored at the target guest memory buffer 220. In the present example, the guest 114 may apply the relocations using the symbol addresses included in the symbol table entries. Symbol table entries may be stored in guest memory 116 such that the guest 114 may access the symbol table entries.

In the present example, the guest 114 applies the relocations by matching the symbol strings included in the relocation entries of the stored code module 204 with the symbol strings of the symbol table entries. For example, a relocation entry may include a symbol string, a relative address that is an offset from a base address, and a pointer to a location in the code/data of the verified code module. A symbol table entry may include the same symbol string and a particular virtual address to use as the base address. For each relocation entry that includes a symbol that matches a symbol included in a symbol table entry, the offset provided by the relocation entry is added to the base address provided by the symbol table entry. The address that results from the addition of the base address and the offset is stored at the location referenced by the relocation entry. Accordingly, the code and/or data of the stored code module is updated to specify a fixed/absolute address.

The guest 114 may similarly apply relocations to other portions of the code and/or data based on the matching between the symbol table entries and the relocation entries, the adding of the base addresses and offsets, and the updating of the code and/or data with the results of the addition. In other examples, relocations may be applied to the stored code module in other ways.

At action 308, the guest 114 sends a request to the hypervisor 110 to set the target guest memory buffer 220 to a write-protect mode. In response to the request, the hypervisor 110 protects the modified code module from further modification by the guest 114. In some examples, the hypervisor modifies the permissions of the memory pages corresponding to entries in the EPT 111. In some examples, the hypervisor protects the modified code module by marking memory pages in the area of guest memory where the modified code module is stored as non-writable and non-executable by the guest operating system.

At action 310, in response to a determination that first content stored in the initial guest memory buffer 206 corresponds to second content stored in the target guest memory buffer 220, the guest 114 sends a request to the hypervisor 110 to set the target guest memory buffer 220 to an executable mode. In response to this request, the hypervisor 110 allows the guest 114 to execute the modified code module. The hypervisor 110 may then return execution back to the guest 114 so that the guest 114 may execute the modified code module stored at the target guest memory buffer 220.

Figure 4:
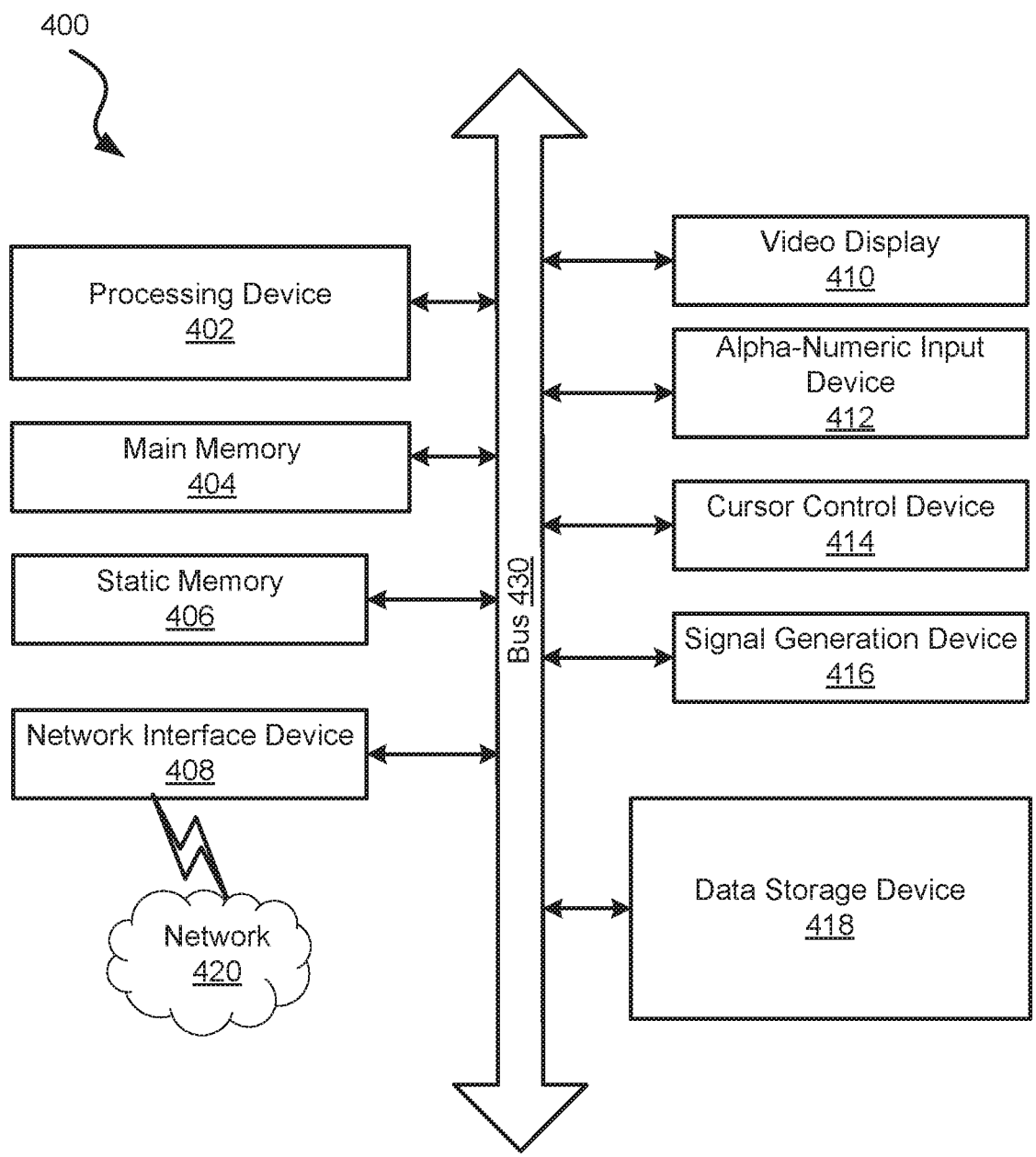
FIG. 4 is a block diagram illustrating a computing system suitable for implementing one or more examples of the present disclosure in accordance with one or more embodiments.

FIG. 4 is an organizational diagram illustrating a computing system 400 suitable for implementing one or more examples of the present disclosure. In the computer system 400, a set of instructions may be executed to perform any one or more of the methodologies discussed herein. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 may be used to implement one or more embodiments of the present disclosure. For example, with respect to FIG. 1, the computer system 400 may provide host hardware 104 that executes computer-readable instructions to provide a hypervisor 110, virtual machine 112, and virtual machine(s) 118.

Computer system 400 includes processing device (processor) 402, main memory 404 (e.g., read-only memory (ROM), flash memory, dynamic random access memory (DRAM) such as synchronous DRAM (SDRAM), double data rate (DDR SDRAM), or DRAM (RDRAM), and so forth), static memory 406 (e.g., flash memory, static random access memory (SRAM), and so forth), and data storage device 418, which communicate with each other via bus 430.

Processor 402 represents one or more general-purpose processing devices such as a microprocessor, central processing unit, or the like. More particularly, processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute instructions for performing the operations and steps discussed herein.

Computer system 400 may further include network interface device 408 that is structured to transmit data to and from the network 420.

Computer system 400 also may include video display unit 410 (e.g., a liquid crystal display (LCD) or a cathode ray tube (CRT)), alphanumeric input device 412 (e.g., a keyboard), cursor control device 414 (e.g., a mouse), and signal generation device 416 (e.g., a speaker).

Data storage device 418 may include a computer-readable storage medium on which is stored one or more sets of instructions (e.g., software) embodying any one or more of the methodologies or functions described herein. The instructions may also reside, completely or at least partially, within main memory 404 and/or within processor 402 during execution thereof by computer system 400, main memory 404 and processor 402 also constituting computer-readable storage media. The instructions may further be transmitted or received over network 420 via network interface device 408.

The network 420 may include any combination of public and/or private networks. The network 420 may include one or more network devices and transport media that are communicatively coupled via transport media. For example, network devices may include routers, hubs, switches, and so forth. Transport media may include, for example, Ethernet cable, Fibre Channel Cable, wireless signals, and so forth.

While data storage device 418 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "verifying," "copying," "setting," "applying," "transmitting," "sending," "comparing," "matching," "loading," "executing," "comparing," "marking," "rejecting," "accepting," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for code loading, the method comprising:
    verifying, by a code loading module, a digital signature of a code module stored in an initial memory buffer;
    copying, by the code loading module, the verified code module stored at the initial memory buffer into a target memory buffer;
    applying, using one or more symbol entries, one or more relocations to the verified code module stored at the target memory buffer;
    sending, by the code loading module, a request to a system resource manager to set the target memory buffer to a write-protect mode; and
    in response to a determination that first content stored in the initial memory buffer corresponds to second content stored in the target memory buffer, sending a request to the system resource manager to set the target memory buffer to an executable mode.

2. The method of claim 1, further comprising:
    loading, by the code loading module, the code module into the initial memory buffer, the code module corresponding to the digital signature and one or more relocation entries, and the code loading module including a kernel that stores a set of symbol entries including the one or more symbol entries; and
    sending, by the code loading module, a request to the system resource manager to set the initial memory buffer to the write-protect mode.

3. The method of claim 2, further comprising:
    after sending the request to the system resource manager to set the target memory buffer to the executable mode, executing, by the code loading module, the verified code module stored at the target memory buffer.

4. The method of claim 2, further comprising:
in response to the determination that the first content corresponds to the second content, sending a request to the system resource manager to set the initial memory buffer to a writable mode.

5. The method of claim 2, wherein the one or more symbol entries are write-protected.

6. The method of claim 2, wherein the digital signature is generated based on an input of the code module and an encryption key into a signature generation module, wherein the encryption key is a member of a key pair with a decryption key.

7. The method of claim 2, further comprising:
comparing the first content and the second content.

8. The method of claim 7, wherein comparing the first content and the second content includes determining whether the first content is the same as the second content.

9. The method of claim 8, further comprising:
determining that the first content corresponds to the second content if the first content is the same as the second content.

10. The method of claim 8, further comprising:
if the first content is different from the second content:
determining a relocation that was applied to the target memory buffer, at a first memory address where the initial memory buffer is different from the target memory buffer;
determining a difference between the first memory address of the initial memory buffer and a first memory address of the target memory buffer;
determining an expected difference between the initial memory buffer and the target memory buffer in accordance with the relocation entry for the relocation that was applied; and
determining that the initial memory buffer corresponds to the target memory buffer if the difference is equal to the expected difference for the relocation.

11. The method of claim 2, further comprising:
marking, by the system resource manager, one or more memory pages corresponding to the code module stored at the initial memory buffer as write-protected;
marking, by the system resource manager, one or more memory pages corresponding to the code module stored at the target memory buffer as write-protected; and
marking, by the system resource manager, one or more memory pages corresponding to the code module stored at the target memory buffer as executable.

12. The method of claim 2, further comprising:
matching, by the code loading module, a symbol string corresponding to the symbol entry with one or more symbol strings of the one or more symbol entries; and
based on the matching, rejecting the symbol entry.

13. The method of claim 2, further comprising:
determining, by the code loading module, that a symbol string corresponding to the symbol entry does not match any symbol strings of the one or more symbol entries; and
based on the determining, accepting the symbol entry.

14. A system for code loading, comprising:
a non-transitory memory; and
one or more hardware processors coupled to the non-transitory memory and configured to read instructions from the non-transitory memory to cause the system to perform operations comprising:
verifying, by a code loading module, a digital signature of a code module stored in an initial memory buffer;
copying, by the code loading module, the verified code module stored at the initial memory buffer into a target memory buffer;
applying, using one or more symbol entries, one or more relocations to the verified code module stored at the target memory buffer;
sending, by the code loading module, a request to a system resource manager to set the target memory buffer to a write-protect mode; and
in response to a determination that first content stored in the initial memory buffer corresponds to second content stored in the target memory buffer, sending a request to the system resource manager to set the target memory buffer to an executable mode.

15. The system of claim 14, wherein the code module corresponds to the digital signature and the one or more relocation entries.

16. The system of claim 14, the operations further comprising:
sending a request to the system resource manager to set the initial memory buffer to a write-protect mode; and
sending a request to the system resource manager to set the target memory buffer to the write-protect mode.

17. The system of claim 14, the operations further comprising:
determining that the first content corresponds to the second content if the first content is the same as the second content.

18. The system of claim 17, the operations further comprising:
if the first content is different from the second content:
determining a relocation that was applied to the target memory buffer, at a first memory address where the initial memory buffer is different from the target memory buffer;
determining a difference between the first memory address of the initial memory buffer and the first memory address of the target memory buffer;
determining an expected difference between the initial memory buffer and the target memory buffer in accordance with the relocation entry for the relocation that was applied; and
determining that the initial memory buffer corresponds to the target memory buffer if the difference is equal to the expected difference for the relocation.

19. A non-transitory machine-readable medium having stored thereon machine-readable instructions executable to cause a machine to perform operations comprising:
verifying, by a code loading module, a digital signature of a code module stored in an initial memory buffer;
copying, by the code loading module, the verified code module stored at the initial memory buffer into a target memory buffer;
applying, using one or more symbol entries, one or more relocations to the verified code module stored at the target memory buffer;
sending, by the code loading module, a request to a system resource manager to set the target memory buffer to a write-protect mode; and
in response to a determination that first content stored in the initial memory buffer corresponds to second content stored in the target memory buffer, sending a request to the system resource manager to set the target memory buffer to an executable mode.

20. The non-transitory machine-readable medium of claim 19, wherein the machine-readable instructions are executable to further cause a machine to perform operations comprising:

loading, by the code loading module, the code module into the initial memory buffer, the code module corresponding to the digital signature and one or more relocation entries, and the code loading module including a kernel that stores a set of symbol entries; and sending, by the code loading module, a request to the system resource manager to set the initial memory buffer to the write-protect mode.

\* \* \* \* \*